United States Patent [19]

Kurimoto et al.

[11] Patent Number: 5,240,783
[45] Date of Patent: Aug. 31, 1993

[54] STEEL PLATE FOR THE OUTSIDE OF AUTOMOBILE BODIES ELECTROPLATED WITH A ZINC ALLOY AND A MANUFACTURING METHOD THEREFOR

[75] Inventors: Tatsuo Kurimoto, Wakayama; Yoshihiko Hoboh, Sennan; Tadashi Nonaka, Wakayama, all of Japan

[73] Assignee: Sumitomo Metal Industries, Ltd., Osaka, Japan

[21] Appl. No.: 259,799

[22] Filed: Oct. 19, 1988

[30] Foreign Application Priority Data

Oct. 19, 1987 [JP] Japan ............................ 62-262995

[51] Int. Cl.$^5$ ............................................. C25D 5/36
[52] U.S. Cl. .................................. 428/659; 205/141; 205/155; 205/217; 428/935
[58] Field of Search ............................ 204/27, 28, 34; 428/659, 935; 205/141, 155, 217

[56] References Cited

U.S. PATENT DOCUMENTS

| 4,264,684 | 4/1981 | Allegra et al. ............... 428/653 |
| 4,541,903 | 9/1985 | Kyono et al. ................. 204/28 |
| 4,569,731 | 2/1986 | Matsuda et al. .............. 204/28 |

FOREIGN PATENT DOCUMENTS

| 0030731 | 6/1981 | European Pat. Off. |
| 0269808 | 6/1988 | European Pat. Off. |
| 52-44720 | 4/1977 | Japan. |
| 56-127761 | 10/1981 | Japan. |
| 57-43974 | 3/1982 | Japan. |
| 61-56245 | 3/1986 | Japan. |
| 63-149321 | 7/1988 | Japan. |
| 63-195222 | 8/1988 | Japan. |
| 1260659 | 1/1972 | United Kingdom. |
| 1396191 | 6/1975 | United Kingdom. |

OTHER PUBLICATIONS

H. Silman et al., Protective and Decorative Coatings for Metals, Finishing Publications Ltd., Teddington, Middlesex, England, 1978, pp. 124-137.

Primary Examiner—John Niebling
Assistant Examiner—William T. Leader
Attorney, Agent, or Firm—Burns, Doane, Swecker & Mathis

[57] ABSTRACT

Steel plate for automobile bodies and a method for manufacturing the steel plate are disclosed, the steel plate containing 0.02~0.03% of P as an alloying element with a total amount of Cu, Ni, Cr, and Mo being more than 0.01% but less than 0.08 weight % and being electroplated with a Zn alloy.

9 Claims, 2 Drawing Sheets

STEEL PLATE FOR THE OUTSIDE OF AUTOMOBILE BODIES ELECTROPLATED WITH A ZINC ALLOY AND A MANUFACTURING METHOD THEREFOR

BACKGROUND OF THE INVENTION

The present invention relates to electroplated steel plate which is suitable for use as the outside of the body of an automobile. More particularly, it relates to steel plate which is electroplated with a Zn alloy such as a Zn-Ni or a Zn-Fe alloy.

In cold regions where there is much snowfall, it is common to spread salt and sand on the roads in order to melt ice and prevent skidding. When vehicles pass over such roads, pebbles in the sand often fly into the air and strikes the sides of the vehicles. If the paint on the outside of the vehicle body is damaged by the gravel, the steel plate constituting the vehicle body can easily corrode. Therefore, automobile manufacturers have been working on improving the painted coating of steel plate for vehicle bodies and have been investigating the use of surface-treated steel plate which is electroplated with metallic Zn or a Zn alloy.

Steel plate which has been electroplated with a Zn alloy prior to painting is superior to steel plate which has been electroplated with elemental Zn prior to painting with respect to resistance to corrosion beneath the painted layer. When the painted layer of steel plate which is electroplated with Zn is damaged, the painted layer undergoes a large amount of creep, i.e., swelling of the painting layer due to the occurrence of underfilm corrosion.

In contrast, in the case of steel plate which has been electroplated with a Zn alloy, even if the paint layer atop the plating is damaged, the plating alone provides fairly good corrosion protection. Furthermore, the painted layer on steel plate which has been electroplated with a Zn alloy undergoes much less creep when damaged than in the case of steel plate which is electroplated with Zn.

Despite these advantages of painted steel plate which is electroplated with a Zn alloy, such plate has the problem that when the painted layer is subject to impact at a low temperature, the plating tends to peel off the steel plate, and the plating and painted layer may peel off the steel plate over a large area. Should both the painted layer and the plating peel off, the steel plate is left with no protection against corrosion. This tendency for peeling to occur is therefore a great impediment to the use of steel plate which is electroplated with a Zn alloy for vehicle bodies.

SUMMARY OF THE INVENTION

Accordingly, it is an object of the present invention to provide a steel plate which is electroplated with a Zn alloy and which has good resistance to peeling of the plating when subjected to impact at a low temperature.

It is another object of the present invention to provide a painted steel plate which is electroplated with a Zn alloy and whose painted layer has good resistance to creeping upon impact at a low temperature.

It is still another object of the present invention to provide a method for the manufacture of such a steel plate.

Japanese Patent Application No. 61-181606, which is assigned to the assignee of the present application, discloses that strengthened pickling of a steel plate is an effective measure against peeling upon impact at a low temperature of Zn alloy plating which is formed on the steel plate by electroplating. If strengthened pickling of a steel plate is performed such that the steel plate undergoes a weight loss of at least 0.8 grams/m$^2$, countless depresses are etched in the surface of the steel plate. Then, when electroplating is subsequently performed, the plating enters the depressions, and the peeling of the plating upon impact at low temperatures is prevented.

However, in order to perform strengthened pickling, it is necessary to increase the pickling time, and this requires either a longer pickling cell, which necessitates a large investment in equipment, or else it requires a decrease in the line speed, which results in decreased productivity.

Given these circumstances, the present inventors investigated the possibility of performing strengthened pickling in a short pickling time by adjusting the steel composition of the steel plate being pickled. It was found that the pickling time can be shortened by the addition of P to a steel plate as an alloying element.

It is well known that the presence of P reduces the workability of steel plate. Since steel plate for the outside panels of automobile bodies must have good workability, the level of P in such steel plate is suppressed as much as possible. According to JIS, the upper limit on the P content is 0.035% for steel plate for cold drawing (SPCD) and is 0.030% for steel plate for deep drawing. Therefore, the level of P in electroplated steel plate for the outside of automobile bodies is restricted to at most 0.02%. Japanese Published Unexamined Patent Application No. 61-284594 discloses that the addition of P in an amount of 0.03~0.3% to steel plate as an alloying element in the presence of at least one of Cu, Ni, Cr, and Mo in a total amount of 0.08~4.5% is effective for improving the adhesion of plating to the steel plate. However, according to that reference, the level of P must be 0.03% or higher, which exceeds the above-described JIS specifications. The reference also states that in the prior art the total amount of cu, Ni, Cr, and Mo is restricted to 0.01% or less, and the P content is up to 0.02%.

In a marked contrast to the disclosure made therein, the present inventors found that the addition of P to steel plate as an alloying element promotes the etching of grain boundaries during pickling, and that even with a short treatment time, it is possible to form a sufficient number of depressions in the surface of the steel plate to prevent the propagation of peeling of the plating. Furthermore, it was found that this effect can be obtained with a P content of 0.02~0.03% and the total amount of Cu, Ni, Cr, and Mo of less than 0.08%, and therefore the above-described JIS specifications can be satisfied.

Accordingly, steel plate for automobile bodies which is electroplated with a Zn alloy in accordance with the present invention is characterized in that 0.02~0.03 weight %, preferably more than 0.02% but less than 0.03% of P is added to the steel as an alloying element, a total amount of Cu, Ni, Cr, and Mo being less than 0.08% by weight, preferably more than 0.01% but less than 0.08%, and that the steel plate is electroplated with an alloy having Zn as a primary component.

A manufacturing method for steel plate in accordance with the present invention comprises pickling steel plate containing 0.02~0.03%, preferably more than 0.02% but less than 0.03% of P as an alloying element, a total amount of Cu, Ni, Cr, and Mo being less than 0.08% by weight, preferably more than 0.01% but less than 0.08%, followed by electroplating the steel plate with an alloy having Zn as a primary component.

The addition of P as an alloying element to steel plate promotes etching of grain boundaries during pickling of the steel plate. As a result, depressions which are necessary in order to prevent the ropagation of peeling of plating can be formed in the surface of the steel plate in the same length of time as is required for normal pickling. Accordingly, the pickling can be performed using conventional pickling equipment at usual line speeds, and an electroplated steel plate having excellent resistance to peeling upon impact at low temperatures can be obtained.

In another aspect, the present invention is a method of improving the resistance of an electroplated steel plate to peeling of coatings upon impact at low temperatures by restricting the P content of the steel plate to 0.02~0.03% by weight and the total amount of Cu, Ni, Cr, and Mo of the steel plate to less than 0.08% by weight, the steel plate being electroplated with a Zn alloy after being subjected to pickling with a weight loss of at least 0.8 g/m² during pickling.

DESCRIPTION OF THE PREFERRED EMBODIMENTS

Figure 1:
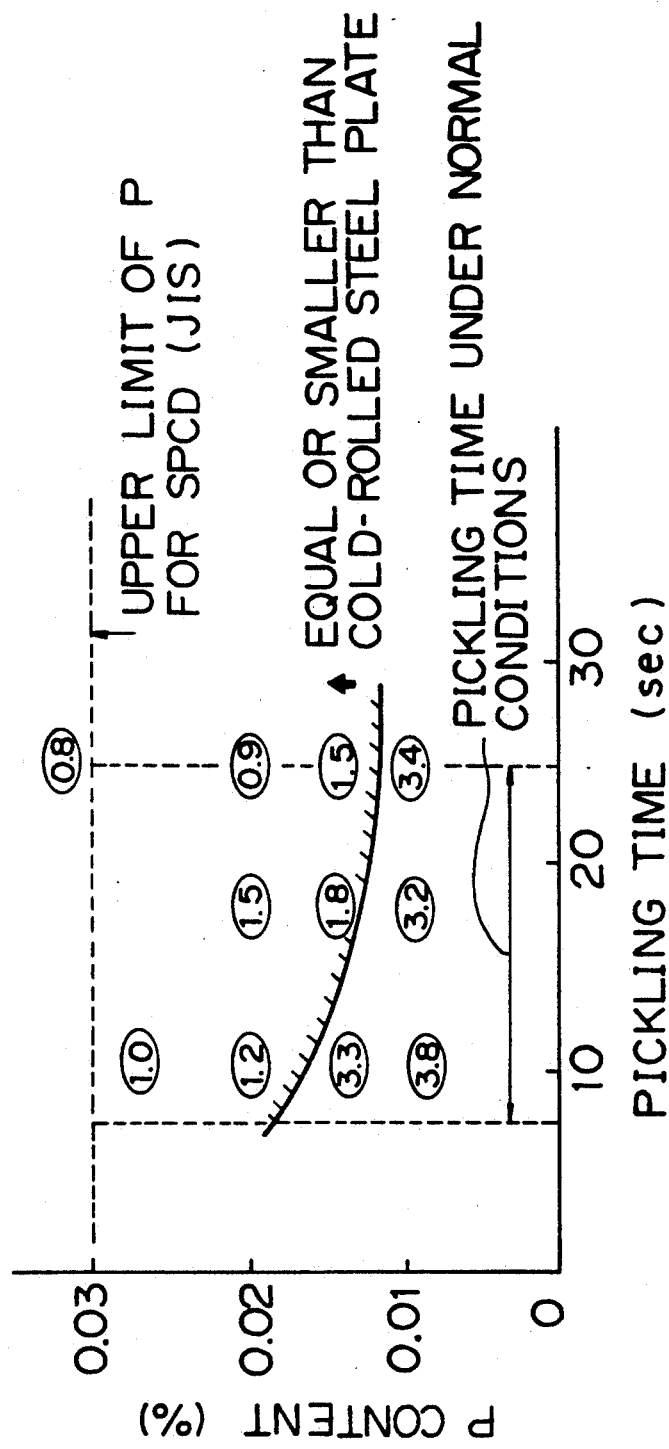
FIGS. 1 and 2 are graphs showing the relationship in respect to average peeling diameter between the P content of steel plate and pickling time for steel plate which was electroplated with two different types of Zn alloy.

As mentioned above, electroplated steel plate in accordance with the present invention contains from 0.02 to 0.03% of P as an alloying element with a total amount of Cu, Ni, Cr, and Mo being less than 0.08% by weight, preferably more than 0.01% but less than 0.08% by weight.

If the amount of P is less than 0.02%, it is necessary to increase the pickling time in order to obtain a sufficient number of depressions to prevent the propagation of peeling of the plating, and this inrease in pickling time makes it impossible to employ conventional pickling equipment or a conventional line speed. On the other hand, P impairs the workability of steel plate, and yield point is also increased when the P content is high. In this respect, when the P content is higher than 0.03%, the yield point is 23 kgf/mm² or higher resulting in the above-mentioned disadvantages. The upper limit on the content of P, therefore, is 0.03%, as specified by JIS. Preferably, the P content is more than 0.02% but less than 0.03% according to the present invention.

Elements such as Cu, Ni, Cr, and Mo are inevitable as an impurity and they have an effect to suppress weight loss during pickling. They are in a marked contrast to P. Thus, according to the present invention the total amount of Cu, Ni, Cr, and Mo is restricted to less than 0.08%, preferably more than 0.01% but less than 0.08% by weight in order to further improve the effectiveness of P. When the total amount of Cu, Ni, Cr, and Mo is not less than 0.08%, a sufficient amount of etching cannot be achieved even if the p content is restricted to 0.02%~0.03%. On the other hand, it is very difficult to reduce the total amount of these impurities to not more than 0.01% from a practical viewpoint. Usually according to the present invention, the total amount of Cu, Ni, Cr, and Mo is limited to from 0.05% to 0.08% (exclusive).

There are no particular restrictions on alloying elements other than P, since only P and the above-described impurities affect the pickling time. The amount of other alloying elements is determined by the desired characteristics of the steel plate. In the case of steel plate for the automobile outer panels, suitable amounts of other alloying elements are as follows.

Indispensable components are:
C: 0.001–0.06%,
Si: at most 0.10%,
Mn: 0.10–0.40%,
S: at most 0.01%, and
Al: 0.01~0.10%

Optional alloying elements are two or more of Ti, Nb, and B.

The pickling of the steel plate can be performed using conventional pickling equipment at a conventional line speed. If pickling is performed such that the steel plate undergoes a weight loss of at least 0.8 grams/m², the formation of an adequate number of depressions in the surface of the steel plate can be guaranteed. Due to positive addition of P to the steel as an alloying element, a weight loss of this magnitude can be obtained using normal pickling conditions. Table 1 shows typical pickling conditions which can be employed.

TABLE 1

|  | Dipping Method | Electrolytic Method |
| --- | --- | --- |
| Line Speed (m/min) | 60–120 | 60–200 |
| Acid Type | HCl | $H_2SO_4$ |
| Acid Concentration (%) | 5–25 | 5–20 |
| Acid Temperature (°C.) | 30–60 | 30–60 |
| Treating Line (m) | 15–25 | 10–20 |
| Current Density (A/dm²) | — | 5–20 |

After pickling, the steel plate can be electroplated with the Zn alloy by conventional means. The plating is primarily a Zn-Ni alloy containing 7–20% of Ni. Elements such as Cr, and Co can also be present as secondary components. A Zn-Fe alloy plating containing 10–20% of Fe can also be employed. Furthermore, it is possible to apply an organic or inorganic chemical conversion coating and a resin coating (in-line post-treatment) atop the plating. Since the steel plate is used for the outer panels of an automobile body, it is not always necessary to plate both sides of the steel plate. The current density and other electroplating conditions are chosen such that a desired degree of adhesion of the plating to the steel plate can be obtained at a prescribed speed of movement of the steel plate.

The present invention will be further described in conjunction with the following examples, which are presented as specific illustrations of the present invention. It should be understood, however, that the present invention is not limited to the specific details set forth in the examples.

EXAMPLES

In order to ascertain the effects of the present invention, electroplating was performed on test pieces having the compositions A–K shown in Table 2. Each test piece measured 0.8 mm×75 mm×150 mm and was made of cold rolled steel plate in the grade of SPCD. The P content in the test pieces varied among 5 different levels. First, the test pieces were thoroughly degreased, after which they were pickled by dipping in a 10% solution of HCl at 50° C. for 5–25 seconds.

Next, each test piece was electroplated with a Zn-13% Ni alloy or a Zn-7% Ni-0.5% Cr alloy under the conditions shown in Table 3. Then, each test piece was subjected to phosphate treatment using SD-2000 (Trade name of Nippon Paint Co.). Electrophoretic coating of a resin (U-52, trade name of Nippon Paint Co.) was then performed. The thickness of the coated resin was 20 μm. An intermediate coating (30 μm thick) was formed using OTO 4811, and a top coating (30 μm thick) was formed using OTO 626 (OTO 4811, and OTO 626 are trade names of paints of Nippon Paint Co. for automobiles).

The resulting coated test pieces were subjected to an impact test in accordance with JIS Z-8801 under the conditions shown in Table 4, after which a tape peeling test was performed. The resistance to peeling by the plating upon impact at a low temperature was evaluated by taking the average value of the peeling diameter at 10 locations. The results are summarized in FIGS. 1 and 2 and in Table 2.

As shown in this figure, when the P content of the steel plate is on the order of 0.01% and a conventional pickling time of at most 25 seconds is employed, the average peeling diameter exceeds 3 mm. Thus, with this type of steel plate, in order to obtain the target value of resistance to peeling upon impact at low temperatures, it is necessary that the pickling time be longer than the conventional pickling time, and therefore it is necessary either to lengthen the pickling cell or lower the line speed, both of which are undesirable.

When the P content is on the order of 0.015%, the target value of peeling resistance is attained with a pickling time of at least 15 seconds. In recent years, there has been a tendency to shorten the pickling time, and some of the newest pickling equipment employs a pickling time of only about 3 seconds. Therefore, it is desirable that the target value of peeling resistance be attainable with a pickling time on the order of 10 seconds, and from this standpoint, a P content on the order of 0.015% is not acceptable.

TABLE 2

| Example No. | Steel | \multicolumn{8}{c}{Steel Composition (wt %)} | Average Peeling Diameter (mm) | Yield Point (kgf/mm$^2$) |
| --- | --- | --- | --- | --- | --- | --- | --- | --- | --- | --- | --- | --- |
| | | C | Si | Mn | P | S | Cu | Ni | Cr | Mo | | |
| 1 | A | 0.001 | 0.02 | 0.21 | 0.009* | 0.005 | 0.01 | 0.02 | 0.02 | — | 3.8 (1.5) | 15.0 |
| 2 | B | 0.001 | 0.01 | 0.21 | 0.013* | 0.005 | 0.01 | 0.01 | 0.02 | 0.01 | 3.3 (1.5) | 16.0 |
| 3 | C | 0.001 | 0.01 | 0.22 | 0.020 | 0.004 | 0.02 | 0.02 | 0.03 | — | 1.2 (1.2) | 17.2 |
| 4 | D | 0.001 | 0.01 | 0.22 | 0.028 | 0.004 | 0.02 | 0.02 | 0.02 | 0.01 | 1.0 (1.0) | 19.8 |
| 5 | E | 0.001 | 0.01 | 0.22 | 0.034* | 0.004 | 0.02 | 0.01 | 0.04 | — | 1.0 (1.1) | 23.5 |
| 6 | F | 0.001 | 0.01 | 0.22 | 0.050* | 0.004 | 0.02 | 0.01 | 0.04 | — | 1.0 (1.0) | 24.0 |
| 7 | G | 0.001 | 0.01 | 0.22 | 0.020 | 0.004 | 0.06* | 0.02* | 0.01* | 0.02* | 3.0 (1.5) | 20.7 |
| 8 | H | 0.001 | 0.01 | 0.22 | 0.020 | 0.004 | 0.02* | 0.01* | 0.01* | 0.04* | 2.8 (1.4) | 20.2 |
| 9 | I | 0.001 | 0.01 | 0.22 | 0.020 | 0.004 | 0.02* | 0.02* | 0.02* | 0.02* | 2.8 (1.4) | 20.2 |
| 10 | J | 0.001 | 0.01 | 0.21 | 0.023 | 0.004 | 0.02 | 0.01 | 0.01 | — | 1.2 (1.5) | 20.0 |
| 11 | K | 0.001 | 0.01 | 0.21 | 0.009* | 0.005 | 0.07* | 0.01* | 0.02* | —* | 5.5 (1.3) | 18.7 |

NOTE *Outside the range of the present invention.

TABLE 3

| | Zn—Ni | Zn—Ni—Cr |
| --- | --- | --- |
| PLATING BATH | | |
| Components | ZnSO$_4$.H$_2$O ... 80 g/l | ZnSO$_4$.7H$_2$O ... 70 g/l |
| | NiSO$_4$.6H$_2$O ... 260 g/l | NiSO$_4$.6H$_2$O ... 200 g/l |
| | | CrO$_3$ ... 20 g/l |
| pH | 2.0 | 2.0 |
| Temperature | 60° C. | 60° C. |
| Current Density | 40 A/dm$^2$ | 40 A/dm$^2$ |
| Plating Weight | 30 g/m$^2$ | 30 g/m$^2$ |

TABLE 4

| Air Pressure | 4 kg/cm$^2$ |
| --- | --- |
| Flow Rate | 40 l/sec |
| Tip | 8-11 mm diameter (granite) |
| Amount Used | 500 g/time |
| Distance from Nozzle to Test Panel | 30 cm |
| Temperature | −20° C. |

FIG. 1 shows the relationship in respect to the average peeling diameter between the pickling time and the P content for the test pieces which were plated with a Zn-13% Ni alloy. The numbers inside the circles indicate the average peeling diameter in mm. The target value for the peeling resistance upon impact at low temperatures was an average peeling diameter of 2.0 mm, which was the value for the same type of cold rolled steel plate which was subjected to phosphate treatment and painting without electroplating.

When the P content of a steel plate is at least 0.02% and the pickling time is 10 seconds, the average peeling diameter is only 1.2 mm. Therefore, it is not necessary to exceed the JIS limit of 0.03% for P in order to attain the target value of peeling resistance, and the degree of workability which is necessary for shaping of steel plate can be guaranteed.

Figure 2:
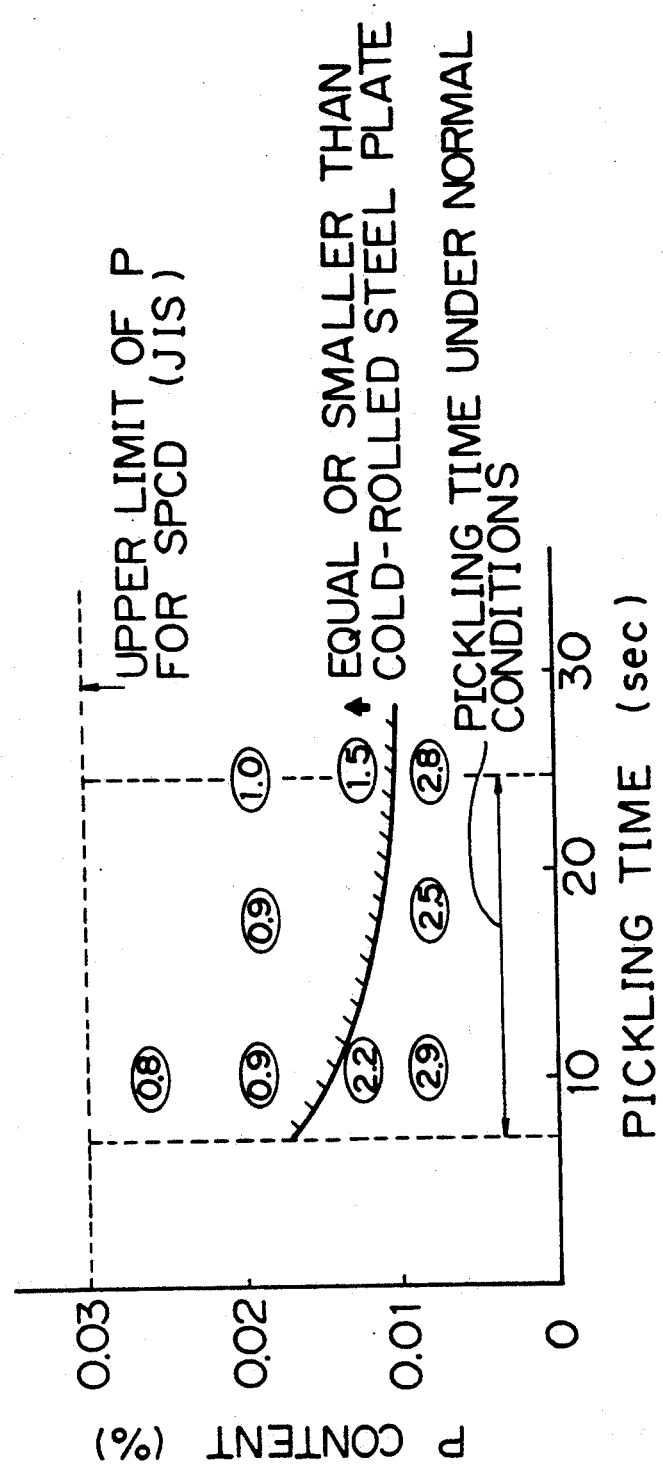

FIG. 2 shows the results for a test piece which was electroplated with a Zn- 7% Ni- 0.5% Cr alloy. It can be seen that with this type of plating, it is effective for the steel plate to contain more than 0.02% of P as an alloying element.

Table 2 also shows test results of the average peeling diameter and yield strength for test pieces which were subjected to the pickling for 10 seconds and was electroplated with Zn-13% Ni alloy. The data shown in Examples Nos. 1~4 correspond to those shown in FIG. 1. In Examples Nos. 7~9, the total amount of Ni, Cu, Cr, and Mo is 0.08% or more, and the average peeling diameter is larger than 2.0 mm. For the purpose of comparison, Zn plating was applied in place of Zn alloy plating to determine the average peeling diameter. The resulting data are shown in parentheses in Table 2. It can be seen that the resistance to peeling achieved by the present invention is comparable to that obtained for a steel plate which is electroplated with Zn.

From the preceding description, it can be seen that the addition of P as an alloying element to steel plate which is electroplated with a Zn alloy imparts excellent resistance to peeling upon impact at low temperature. Steel plate which is electroplated with a Zn alloy has high resistance to corrosion beneath a painted film, i.e.

underfilm corrosion, and therefore the present invention greatly increases the value of steel plate of this type for use in the outside of automobile bodies. The method of the present invention does not require an increase in pickling time, and it can be performed efficiently and economically using existing equipment at a high line speed, so that increases in manufacturing costs are minimized. Furthermore, the P content is restricted to a level which does not impair workability, so the steel plate of the present invention can be effectively used as steel plate for the automobile outer panels, which requires a high level of workability.

Although the present invention has been described with preferred embodiments it is to be understood that variations and modifications may be employed without departing from the concept of the present invention as defined in the following claims.

We claim:

1. Steel plate for automobile bodies which is electroplated with an alloy, characterized in that said steel plate contains 0.02~0.03 weight % of P as an alloying element, a total amount of Cu, Ni, Cr, and Mo being more than 0.01 and less than 0.08 weight %, and in that said alloy has Zn as a primary component.

2. Steel plate as claimed in claim 1, further comprising 0.001-0.06% of C, at most 0.10% of S, 0.10-0.40% of Mn, at most 0.01% of Si, and 0.01~0.1% of Al.

3. Steel plate as claimed in claim 2, further comprising two or more substances selected from Ti, Nb, and B.

4. Steel plate as claimed in claim 1, wherein said alloy is selected from a Zn-Ni-alloy, a Zn-Ni-Cr alloy, and a Zn-Fe alloy.

5. A method of manufacturing electroplated steel plate for automobile bodies, comprising the steps of:
   pickling a steel plate containing 0.02-0.03 weight % of P as an alloying element, a total amount of Cu, Ni, Cr, and Mo being less than 0.08 weight % such that said steel plate undergoes a weight loss of at least 0.8 grams/m$^2$ during said pickling; and
   electroplating the pickled steel plate with a zinc alloy.

6. A method as claimed in claim 5, wherein said steel plate further comprises 0.001-0.06% of C, at most 0.10% of Si, 0.10-0.40% of Mn, at most 0.01% of S, and 0.01~0.1% of Al.

7. A method as claimed in claim 6, wherein said steel plate further comprises two or more substances selected from Ti, Nb, and B.

8. A process for improving the resistance to creeping upon impact at a low temperature of automobile outer panels of a steel plate which is electroplated with an alloy containing Zn as a primary component, characterized by adjusting the P content of the steel to be 0.02-0.03%. the content of Ni, Cu, Cr, and Mo to be less than 0.08%.

9. A process recited in claim 8, in which the total amount of Ni, Cu, Cr, and Mo is restricted to more than 0.01% but less than 0.08% by weight.

* * * * *